United States Patent [19]
Richter

[11] 3,710,513
[45] Jan. 16, 1973

[54] DOOR STRUCTURE FOR CARGO CONTAINER
[75] Inventor: Robert D. Richter, Torrance, Calif.
[73] Assignee: Tridair Industries, Redondo Beach, Calif.
[22] Filed: Nov. 24, 1971
[21] Appl. No.: 201,924

[52] U.S. Cl. ................................................49/464
[51] Int. Cl. ............................................E06b 3/32
[58] Field of Search.........49/463, 465, 276, 277, 278

[56] References Cited

UNITED STATES PATENTS 2,920,781   1/1960   Butcher et al. ......................49/463 X
1,464,694   8/1923   Campbell ..............................49/277
364,753     6/1887   Corry ..................................49/277 X Primary Examiner—Kenneth Downey
Attorney—Arthur W. Fuzak and Thomas A. Seeman

[57] ABSTRACT

A cargo container has a removable door structure comprising a plurality of sections which slidably fit within a track which runs along the edge of the floor of the container. A tongue of the bottom of the door sections rides in a groove in the track between two lip portions thereof. One of the door sections has a door operating mechanism which in sequence first operates latch bar means to disengage this door section from adjacent door sections, and then operates a push bar which drives against the lip of the track to lift the tongue of the door section out of the track groove to enable easy removable of this door section.

9 Claims, 8 Drawing Figures

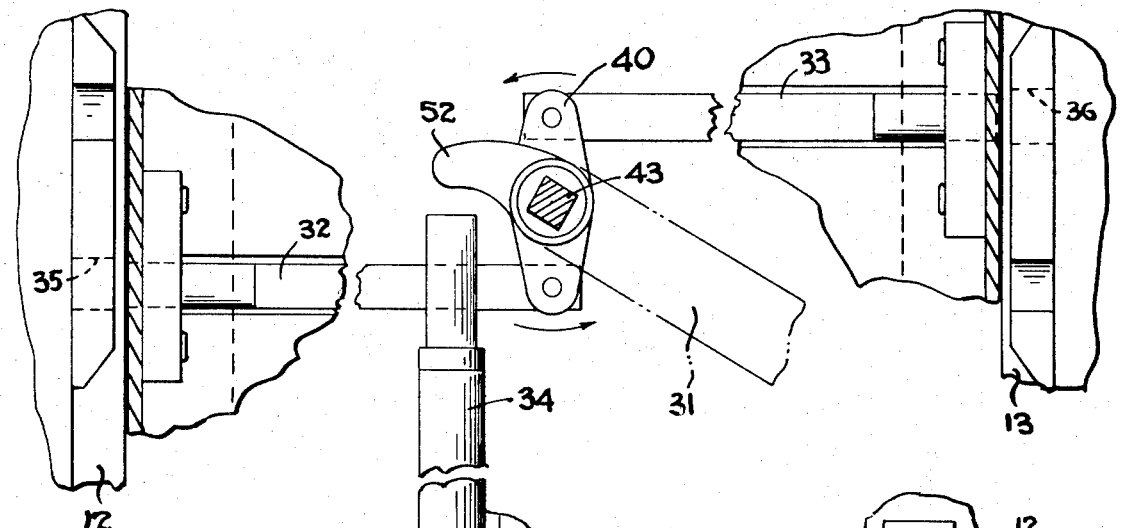
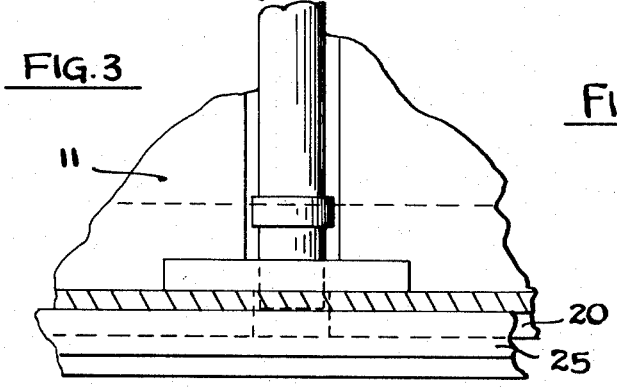
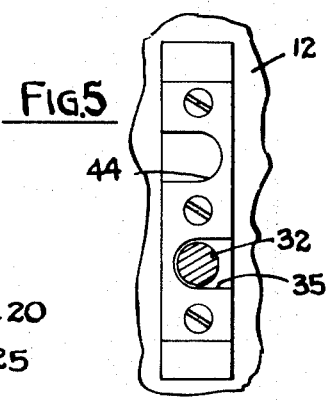
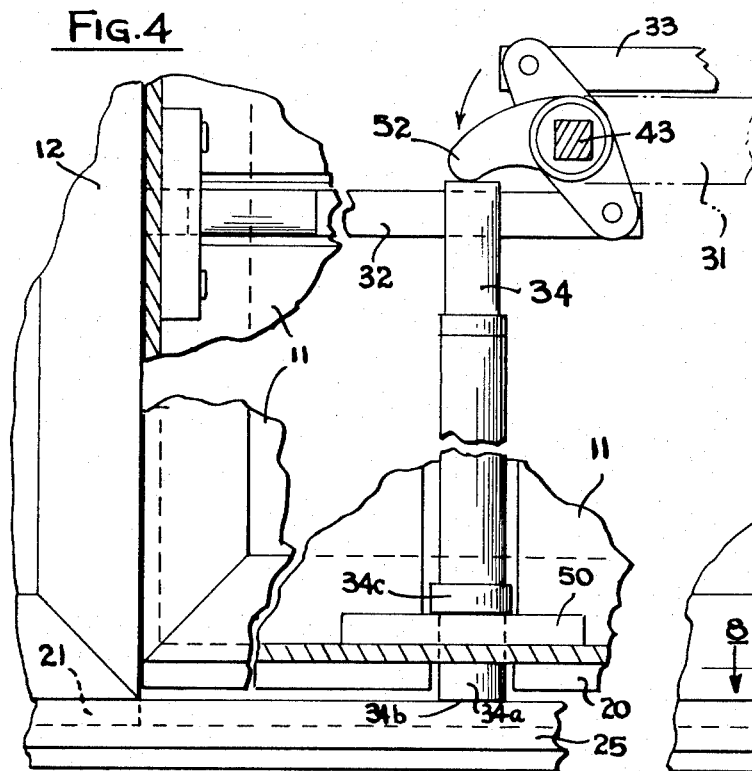
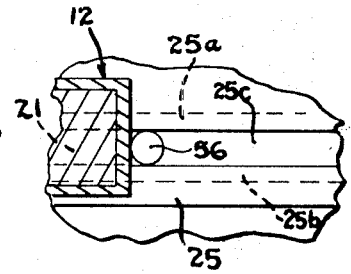

PATENTED JAN 16 1973

DOOR STRUCTURE FOR CARGO CONTAINER

This invention relates to cargo containers and more particularly to such containers utilizing removable door sections.

Cargo containers having removable door sections for facilitating the loading and removal of cargo therefrom have come into widespread use, particularly for handling air cargo. These containers, which are sometimes referred to as "igloos," often have three door sections with tongues along the bottom edges thereof which fit into a track which runs along the edge of the floor of the container. The top and side edges of the door sections fit into grooves formed in the corresponding edges of the container. While this type of arrangement enables the ready removal of the door sections for loading and unloading, it has been found that in unloading, quite often the contents of the container becomes jammed against the walls of the door due to the shifting of the cargo during transportation, so as to make it difficult or impossible to lift the door section out of the track. In many instances, in order to remove the cargo it is necessary to break one or more of the door sections. This not only has the obvious disadvantage of requiring repair or replacement of the damaged door sections, but sometimes in the breaking of the door the cargo is damaged.

The door structure of this invention overcomes the aforementioned difficulties experienced with such structures of the prior art in providing a unique door operating mechanism on one of the door sections which in a sequential operation first operates a latching mechanism to detach this door section from the adjacent door sections and then operates a push rod which drives against the lip of the track to draw the door section tongue out of the track so that the door can be readily removed. Thus, by virtue of the mechanical advantage afforded by the device of the invention an operator can readily remove the door even with heavy loads jammed thereagainst.

A preferred embodiment of the door structure of this invention affords a further advantage in providing side sections which can be used interchangeably on either the left or the right side, thus affording increased versatility and optimum utilization of parts by making it necessary to have only a single type of door section for use either on the left or the right, while formerly separate types of sections were needed for each of these functions.

It is therefore an object of this invention to facilitate the removal of door sections in cargo containers.

It is a further object of this invention to provide an improved removable cargo container door structure having greater versatility than such prior art structures.

It is still another object of this invention to provide an improved cargo container door structure which affords mechanical leverage in removing one of the door sections.

It is still another object of this invention to facilitate the opening of cargo container doors in situations where cargo is jammed thereagainst.

Other objects of this invention will become apparent as the description proceeds in connection with the accompanying drawings, of which:

FIG. 3 is an elevational view illustrating the door operating structure of FIG. 2 on completion of a first sequence of operation;

FIG. 4 is an elevational view illustrating the door operating mechanism of FIG. 2 in its final operating position;

FIG. 5 is a view taken along the plane indicated by 5—5 in FIG. 2;

FIG. 6 is a side elevation view illustrating the left hand door of the embodiment of FIG. 1 in a position in the track for removal therefrom;

FIG. 8 is a cross sectional view taken along the plane indicated by 8—8 in FIG. 6.

Briefly described, the door structure of this invention comprises a plurality of door sections, the number of sections in the illustrative embodiment being three and including a central section and left and right hand sections which adjoin the central section. The side sections are constructed so that they are interchangeable with each other in that the opposite faces of each section are mirror images of each other and the sections have double latching receptacles along their inner edges so that they are fully interchangeable, i.e., either section can be used as either a left hand or a right hand door section. The central door section includes a door operating mechanism having an operating handle which when drawn upwardly first actuates a pair of door latching bars so as to withdraw these bars from the latching receptacles in the left and right sections thereby freeing the central section from the two side sections. Further movement of the handle provides a second sequence of operation in which a push rod slidably mounted in the door section is driven downwardly against the lip portions of a track in the compartment in which a tongue on the bottom of the door section is fitted. The push rod is driven against these lip portions so as to cause the door section tongue to be drawn out of the groove in the track. The door section is then free to be withdrawn from the track and removed from the compartment. The mechanical advantage provided by the action of the handle in conjunction with its associated operating mechanism and the push rod is great enough so that even with considerable force applied against the door section by a displaced load, the door section can still be readily removed.

Figure 1:
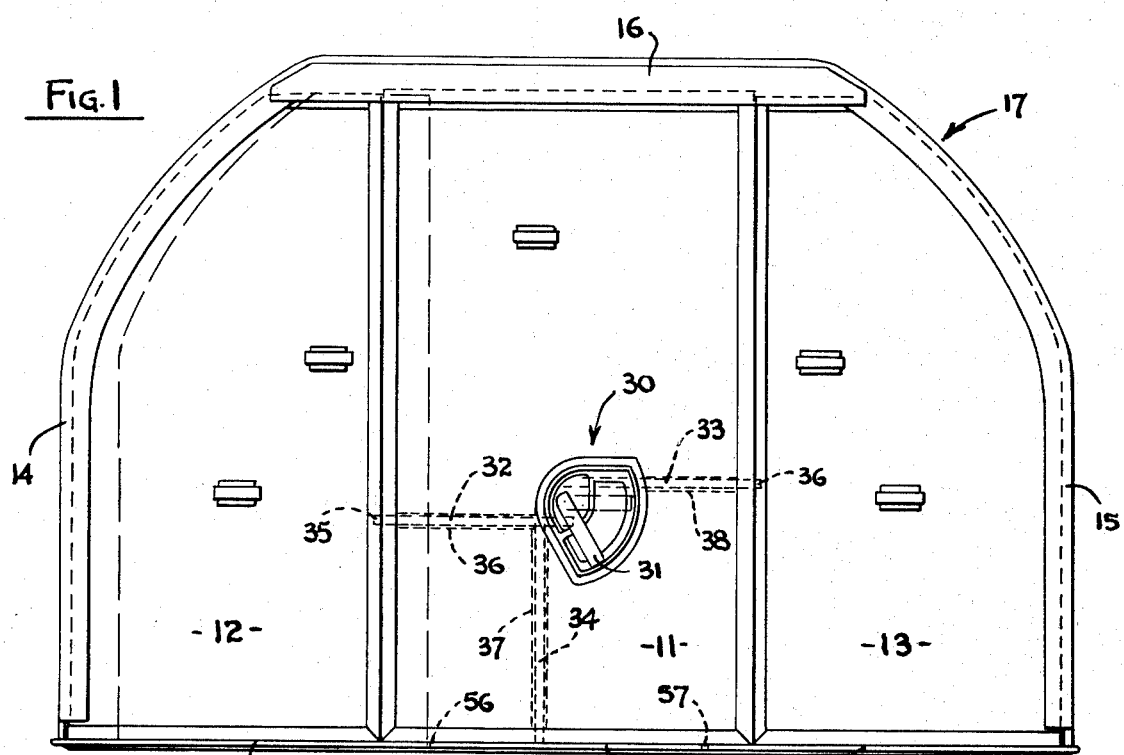
FIG. 1 is an elevational view illustrating one embodiment of the door structure of the invention.

Referring now to FIG. 1, one embodiment of the door structure of the invention is illustrated in elevation. The door structure comprises a center section 11, a left hand section 12 and a right hand section 13. The door sections are fitted into grooved portions 14, 15 and 16, formed in the front edges of side and top portions of container 17. The bottom edges of the door sections have tongues 20, 21 and 22 respectively, which fit into track 25 which runs along the bottom front edge of the container as best can be seen in some of the other figures and will be described further on in the specification.

The center door section 11 has a door operating mechanism 30. The door operating mechanism includes a handle 31, which, as to be explained more fully further on in the specification in connection with the other drawings, is used to actuate draw bars 32 and 33 which latch the center door to the side doors, and push rod 34 which provides camming action against the lip of track 25 to lift tongue 20 out of the track. Door mechanism 30, as handle 31 is lifted, first withdraws bars 32 and 33 from latching receptacles 35 and 36 in side doors 12 and 13 respectively. Then, as handle 31 is lifted further, push rod 34 is driven against the track 25 to permit removal of the center door. Draw bars 32 and 33 and push rod 34 are slidably mounted in slots 36, 38 and 37 respectively, which are formed in the center door section.

Figure 2:
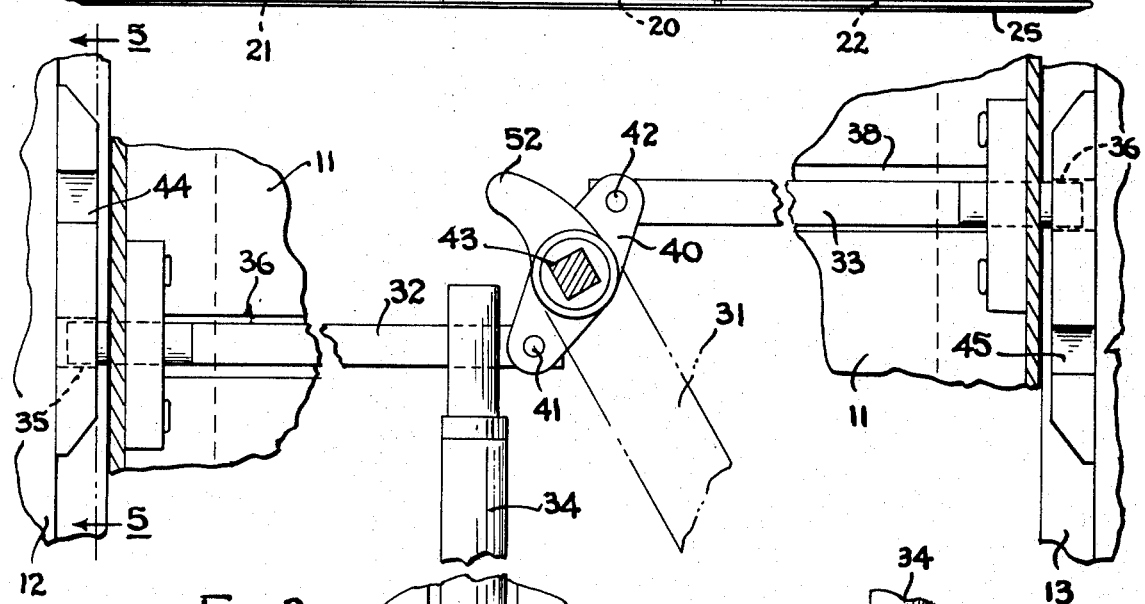
FIG. 2 is an elevational view illustrating the door operating mechanism of the embodiment of FIG. 1 in its initial position.
Figure 7:
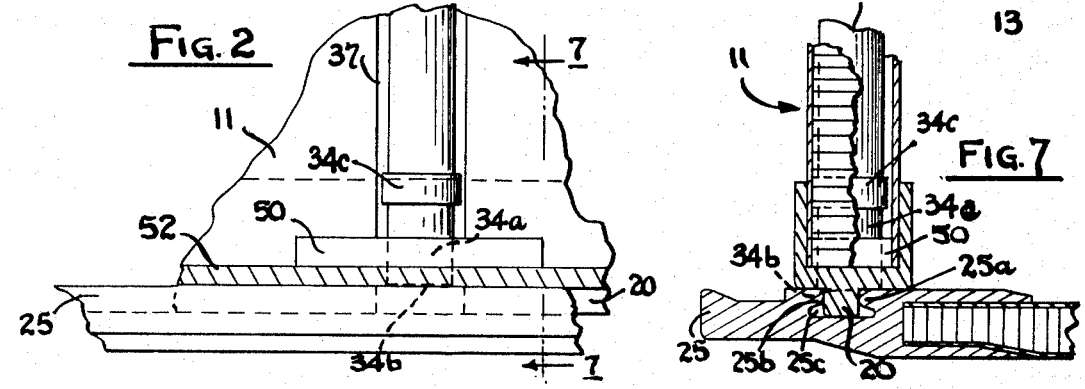
FIG. 7 is a cross sectional view taken along the plane indicated by 7—7 in FIG. 2.

Referring now to FIGS. 2, 5 and 7, the details of the door operating mechanism are illustrated. Handle 31 is fixedly attached to bell crank 40, the bell crank being pivotally connected to draw bars 32 and 33 at pivot points 41 and 42 respectively. The handle is pivotally supported on door section 11 by means of pin 43 to which the handle is fixedly attached. Cam 52 is fixedly attached to bell crank 40 or may be integrally formed therewith. The ends of draw bars 32 and 33 fit into latching receptacles 35 and 36 formed in the side edges of door sections 12 and 13 respectively. As can best be seen in FIG. 5, door section 12 has a substantially U-shaped latching receptacle 44 which opens to the opposite side of door 12 from receptacle 35, i.e., in this instance receptacle 44 opens to the inside of the door section. Door section 13 similarly has a latching receptacle 45 which opens to the opposite side of the door section from receptacle 36. It is also to be noted that latching bar 33 is offset vertically from latching bar 32. This combination of features enables the interchangeability of the doors to the left or right hand side, the left and right hand door sections being identical in construction.

Push rod 34, which as already noted is slidably mounted in door section 11, has its end portion 34a fitted through an aperture formed in stop plate 50 and another aperture formed in the bottom edge strip 52 of door section 11. The end surface 34b of push rod 34 abuts against lip portions 25a and 25b of rail 25 (see FIG. 7). Push rod 34 has a protruding stop ring 34c thereon which abuts against stop plate 50 and prevents the push rod from slipping through the bottom of the door section when it is removed from the container.

FIGS. 1, 2, 5 and 7 illustrate the door sections in their installed position with tongue 20 retained in track groove 25c between lips 25a and 25b. Also in this position, draw bars 32 and 33 are inserted in their respective latching receptacles 35 and 36.

Referring now to FIG. 3, a first sequence in the operation of the door operating mechanism is illustrated. As can be seen, handle 31 has been moved upwardly to bring bell crank 40 to a vertical position. In this position it can be seen that draw bars 32 and 33 are completely withdrawn from their associated latching receptacles 35 and 36 in door sections 12 and 13 respectively. Thus, the central door section 11 is now unlatched from side door sections 12 and 13 so that it is free to be removed from the container but for retention of tongue 20 in track 25.

Referring now to FIG. 4, the second sequence in the operation of the door operating mechanism is illustrated. In this second sequence of operation, door handle 31 is drawn upwardly to a horizontal position and cam 52 has driven push rod 34 downwardly against the lip portions 25a and 25b (see FIG. 7) of track 25 so as to push the door section in an upward direction and draw tongue 20 out of the track slot. The door section can then be moved outwardly with the handle and thus is fully removed from the container.

Referring now to FIGS. 6 and 8, the removal of the left hand door 12 from track 25 is illustrated. As can be seen, the tongue portion 21 of the door section rides in the groove of the track in the same fashion as for the center door section. The left hand door section is shown as moved to the right along the track in its position for removal after the center door section has been removed. A locating pin 56 is provided in the track to index the position for removal. A similar stop pin 57 (see FIG. 1) is provided for indexing the right hand door. A suitable slot (not shown) is provided in center door 11 to avoid interference with the stop pins 56 and 57.

The door structure of this invention thus provides simple yet highly effective means for removing the door sections of a cargo container, which is particularly useful when there are loads thereagainst. By a single movement of the door handle, a center door section is unlatched from side door sections and leverage is provided to lift the door out of the retaining track in the bottom of the container so that it can easily be removed. Further, side doors are fabricated so that the left and right door sections are interchangeable with each other so that only a single part is needed for both functions.

While the door structure of this invention has been described and illustrated in detail, it is to be clearly understood that this is intended by way of illustration and example only and is not to be taken by way of limitation, the spirit and scope of this invention being limited only by the terms of the following claims.

I claim:

1. In a cargo container having a removable door, said door having a tongue running along the bottom edge thereof, said container having a track running along the front bottom edge thereof for receiving the tongue of said door, the improvement comprising a door operating mechanism for unlatching and removing said door from said track, said door operating mechanism including:

a handle, means for pivotally attaching said handle to said door, a push rod slidably supported in said door, one end of said push rod being fitted through the bottom edge of said door, said track having a grooved portion and a pair of lip portions, the tongue on the bottom of said door being fitted in said grooved portion between said lip portions, the bottom end of said push rod abutting against the lip portions of said track, cam means fixedly attached to one end of said handle for driving said push rod downwardly when said handle is actuated, said push rod bearing against the lip portion of said track to draw the door tongue out of said track for removal therefrom, and latching means operated by said handle for latching and unlatching said door, said latching means unlatching said door prior to actuation of said push rod whereby said door may be unlatched and the door tongue raised from the track in consecutive order by continuous movement of the handle.

2. The device of claim 1 wherein said door has a vertical slot formed therein, said push rod being mounted in said slot, said door having a stop plate through which said push rod passes, said push rod having a stop ring therein which abuts against said stop plate to prevent said rod from slipping out of said door.

3. The device of claim 1 wherein said door is defined further as a central door section with left and right door sections, mounted on either side thereof, said door operating mechanism being mounted on said central section, said left and right door sections having latching receptacles formed therein, said latching means further defined as including first and second draw bars slidably mounted on said central door section, said first and second draw bars fitting into the latching receptacles in said left and right door sections respectively with the door in its installed position on the container, and means for withdrawing said draw bars from said receptacles in response to actuation of said handle immediately prior to the actuation of said push rod.

4. The device of claim 3 wherein said means for actuating said draw bars comprises a bell crank fixedly connected to said door handle and pivotally attached at each of the opposite ends thereof to each of said draw bars respectively.

5. The device of claim 4 wherein said draw bars are offset from each other vertically, said left and right door sections each including a second latching receptacle spaced from said first receptacle by a distance substantially equal to the vertical displacement of said draw bars from each other, thereby permitting interchangeability of said left and right door sections.

6. The device of claim 5 wherein said latching receptacles are substantially U-shaped, the "U's" of the latching receptacles of each door section opening in opposite directions.

7. In a cargo container having a central door section and a left and right hand door section adjacent to said central section, said door sections having tongues along the bottom edges thereof, said container including slots for receiving the side and top edges of said doors and a track running along the bottom edge of the container for receiving the tongues of said door sections, said track having a slot and a pair of lip portions, the tongues of said door sections being retained in said slot between said lip portions, the improvement comprising a door operating mechanism for facilitating the removal of said central door section from said container, said door operating mechanism comprising:
- a door handle pivotally supported near one end thereof on said door section,
- a bell crank fixedly attached to said doorhandle near said one end thereof,
- a pair of draw bars pivotally attached to said bell crank near each of the opposite ends thereof, said draw bars being slidably mounted in said central door section,
- latching receptacles formed in the edges of said left and right hand door sections for respectively receiving each of said draw bars,
- a cam member fixedly attached to said bell crank,
- a push rod slidably mounted in said central door section, one end of said push rod protruding through the bottom edge of the central door section in abutment against the lip portion of said track, the other end of said push rod being in proximity to said cam member,
- whereby when said handle is moved toward the top edge of said central door section, said draw bars are first withdrawn from the latching receptacles in the left and right hand door sections and then said cam member drives said push rod against the track to withdraw the central door section tongues from the slot thereof.

8. The device of claim 7 wherein said draw bars are substantially normal to said push rod and displaced from each other along the vertical axis of said central door section, each of the left and right hand door sections additionally having a second latching receptacle displaced from the first mentioned latching receptacle by a distance substantially equal to the displacement between said draw bars, thereby facilitating interchangeability of the left and right hand door sections with each other.

9. The device of claim 8 wherein said push rod is freely mounted in said door and further including a stop plate mounted in said door through which said push rod is fitted, said push rod having a stop ring thereon which abuts against said stop plate to prevent said push rod from falling from said door section when said door section is removed from the container.

* * * * *